United States Patent
Yeh et al.

(10) Patent No.: US 6,835,433 B2
(45) Date of Patent: *Dec. 28, 2004

(54) OPTICAL RECORDING MEDIUM

(75) Inventors: Sue-Min Yeh, Taipei (TW); Kao-Ming Chang, Tainan (TW); Wen-Pin Chiu, Taipei (TW); Chiung-Man Huang, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 55 days.

This patent is subject to a terminal disclaimer.

(21) Appl. No.: 10/309,648

(22) Filed: Dec. 4, 2002

(65) Prior Publication Data

US 2004/0109973 A1 Jun. 10, 2004

(51) Int. Cl.$^7$ ................................................. B32B 3/02

(52) U.S. Cl. .................... 428/64.1; 428/64.4; 428/64.8; 430/270.14; 430/270.18

(58) Field of Search ............................... 428/64.1, 64.4, 428/64.8, 913; 430/270.14, 270.18, 945

(56) References Cited

U.S. PATENT DOCUMENTS

2004/0043179 A1 * 3/2004 Yeh et al. .................. 428/64.1

* cited by examiner

*Primary Examiner*—Elizabeth Mulvaney
(74) *Attorney, Agent, or Firm*—Thomas, Kayden, Horstemeyer & Risley

(57) ABSTRACT

An optical recording medium is provided on a substrate with a recording layer. The recording layer comprises at least one kind of the trimethine-cyanine dyes and an additive, wherein the additive has a larger absorbability at the wavelength of laser beam.

15 Claims, 6 Drawing Sheets

OPTICAL RECORDING MEDIUM

BACKGROUND OF THE INVENTION

1. Field of the Invention

This invention relates to an optical recording medium, particularly to an optical recording medium for recording layer comprising at least one trimethine-cyanine dye with specific functional group and an additive, which can enhance the electric properties of DVD recordable system.

2. Description of the Related Art

An optical recording medium capable of once recording by a laser ray has been known. In the structure of the CD-R recording medium, a recording layer comprising an organic dye, a reflective layer and a protective layer are laminated on a transparent substrate by order. The recording information on the disc is performed by irradiating a laser at a wavelength of 780 nm to 830 nm to cause exothermic deformation of the recording layer. The information is usually reproduced by irradiating with the same laser ray, and the reflecting difference between the recorded area and unrecorded area is detected for the recording layer.

It is known that a laser ray with a shorter wavelength has a reduced light spot. Therefore, studies have being made to develop the optical disc capable of recording and reproducing by a laser beam of a wavelength of 620 nm to 690 nm to increase the recording density. Recordable digital video (DVD-R), which is capable of recording and reading in high density, is propagated as new media of the next generation. Since the wavelength zone for performing the recording and reproducing in DVD-R differs from that of the CD-R, the criteria for selecting the recording material to be employed for the CD-R cannot be applied to the DVD-R. Hence, new selection criteria are required to be established from a viewpoint peculiar to the DVD-R.

There is also a new type disc named DVD+R. Although there are some differences at the disc specification between DVD-R and DVD+R, but the writing wavelength of laser beam domain in the same range, that is from 645 nm to 670 nm, so the DVD+R system still needs a recording material with high sensitivity at the recording wavelength.

Trimethine-based cyanine dye is a popular material for the DVD-R recording layer. U.S. Pat. No. 5,976,658, and U.S. Pat. No. 6,291,045 described the use of trimethine-based cyanine dye having symmetry or asymmetry indolenine structure for DVD-R. However, the dye material should be selected carefully, while the writing wavelength of laser beam of DVD-R machines is changed from 635 nm to 660 nm (or further). Because the wavelength of laser power is getting longer, the dye absorbance of film state for 660 nm should be increased a little more. The dye, which is suitable for writing wavelength of 635 nm laser beam, is not performed well while the writing wavelength of laser beam is 660 nm because low sensitivity at the region might cost higher writing power to record information or fail in record.

SUMMARY OF THE INVENTION

Said in U.S. Pat. No. 6,338,888, increase the sensitivity of recording could be reached by increasing the absorption of organic layer at the wavelength of writing laser. According to the opinion, we declare a new composition with specific additives, which could enhance the recording sensitivity.

The first object of the present invention is to provide an optical recording medium having a recording material which contains at least one trimethine-based cyanine dye with the formula (I):

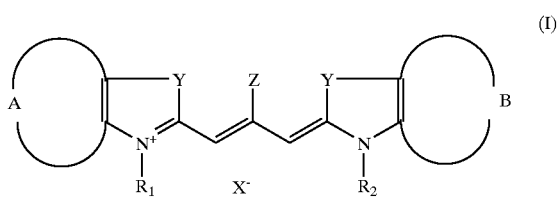

and an additive, which has a little absorption at the wavelength of write/read laser beam, such as any one of the following formulas (II) to (IX):

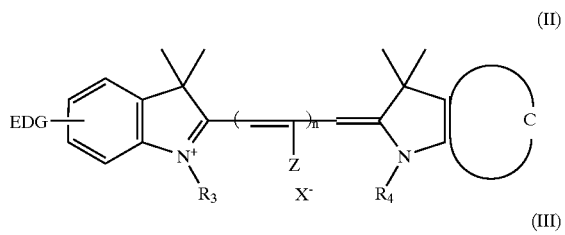

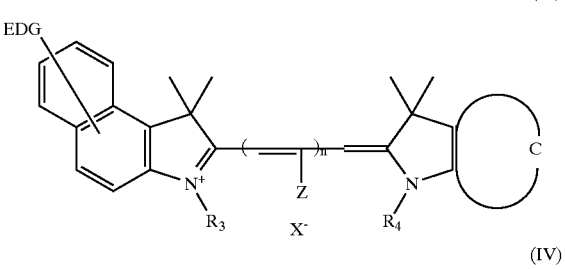

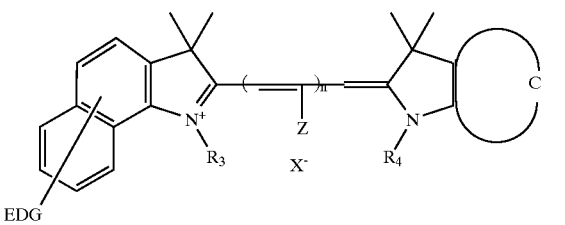

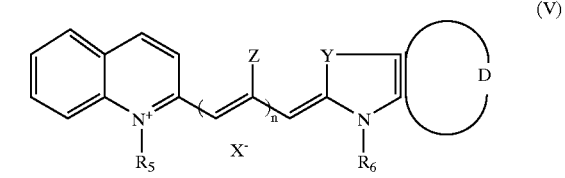

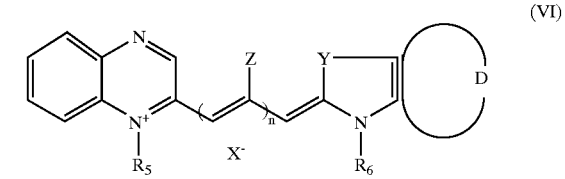

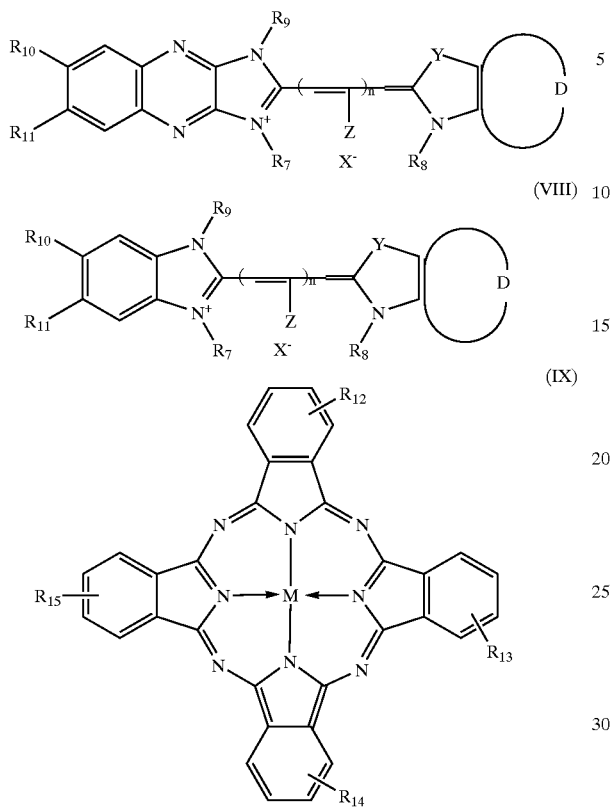

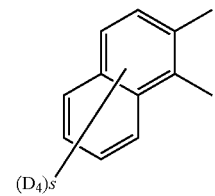

The second object of the present invention is to provide an optical recording medium with improved write/read characteristics at the writing wavelength of 660 nm or further.

According to the invention, the asymmetric trimethine-cyanine dye with electron-withdrawing substituted group (EWG) used in the recording layer is any one represented by the general formula (I).

In formula (I), "A" and "B", different from each other, represent any one of the following general formulas (1), (2), (3), and (4):

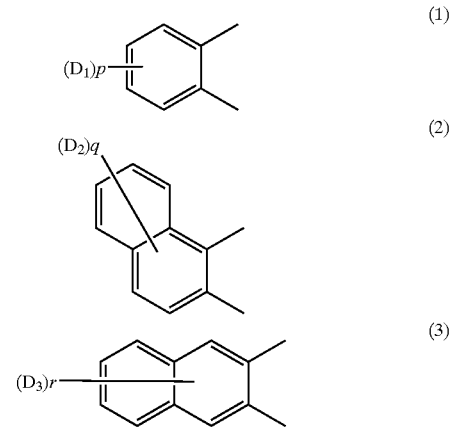

One of the substituted group: $(D_1)p$, $(D_2)q$, $(D_3)r$, $(D_4)s$, which is substituted on the ring "A" or ring "B", should be an electron-withdrawing substituted group, such as cyano and nitro group.

"A" and "B", may be the same from each other, represent any one of the following general formulas (2), (3), and (4).

$(D_2)q$, $(D_3)r$, $(D_4)s$ may be any one of the substituted or unsubstitued alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl group which are bonded to a metallic ion or alkyl, phenyl, benzyl, alkylphenyl or phenoxyalkyl group.

"p", "q", "r", "s" represent the number of subsistent groups, which is an integer of 1 or more.

"C" and "D" may be represent any one of the general formulas (1), (2), (3), and (4).

"$R_1$" and "$R_2$" may be the same or different from each other and are individually substituted or unsubstitued alkyl, phenyl, benzyl, alkylphenyl, allyl or phenoxyalkyl group.

"Z" is hydrogen atom, halogen atom or alkyl group

"X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonat akylcarboxylate.

"Y" could be an atom such as O, S, Se, N, or substituted or unsubstitued alkyl group, such as $C(Me)2$.

"$R_3$" to "$R_{15}$" may be the same or different from each other and are individually substituted or unsubstitued alkyl, phenyl, benzyl, alkylphenyl or phenoxyalkyl group.

"EDG" represents any electron-donating substituted group such as amino, alkylamino and methoxy group.

"M" is a center atom, it could be a hydrogen atom☐ a metal atom or metal oxide, such as Cu, Pd, Ni, Fe, Co, VO.

"n" is an integral, such as 1,2.

Further, the method of preparing dye solution according to this invention is provided, and described as follows.

(1) A cyanine dye represented by general formula (I) is dissolved in an organic solvent, such as fluorinated alcohol, diaceton alcohol, methylethyl ketone, methanol, toluene, cyclohexanone, acetylacetone, and dioxane. The concentration of the dye solution is 0.5% to 20% by weight.

(2) A dye mixture, which contains cyanine dye represented by general formula (I) mixed with an additive of formula (II) to (IX), that is less than 50% by weight, is dissolved in an organic solvent such as fluorinated alcohol, diaceton alcohol, methylethyl ketone, methanol, toluene, cyclohexanone, acetylacetone and dioxane. The concentration of the dye solution is 0.5% to 20% by weight.

Further, the manufacture of the optical recording medium according to this invention is provided, and performed as follows.

(A) The material for the substrate may be glass, epoxy resin, methacrylate resin, polycarbonate, polyester resin, polyvinyl chloride resin, or polyolefin resin. The substrate may be provided with the tracking grooves or pits.

(B) The dye solution is provided on a substrate by means of a spin-coating method.

(C) After spin-coating, the substrate with dye film is baked at the temperature of 90° C. for 1 hr to 3 hr.

(D) The optical recording medium may further include a reflective layer in addition to the recording layer. The reflective layer, single or multiple films with high reflectivity, can be formed by the vapor-deposition or sputtering a metal, such as Gold, Aluminum, Silver, Cupper, Platinum, or alloy.

(E) The reflective layer may be provided with a protective layer. It is formed for the purpose of protecting or improving the optical recording medium, and can be formed by coating a solution of a radiation cure type resin on a given surface, followed by radiation-curing the coater layer.

(F) The optical recording medium may be a single-side recording medium obtained by laminating a single-side substrate and a non-grooved substrate with an adhesion. The single-side optical recording medium has been prepared by process (A) to (E).

(G) The optical recording medium may be a double-side recording medium obtained by laminating two single-side optical recording medium with an adhesion. The single-side optical recording medium has been prepared by process (A) to (E).

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 10 is the comparison of UV-VIS spectrum of dye solutions between Example 3 and Comparative Example 4.

DETAILED DESCRIPTION OF THE INVENTION

Figure 1:
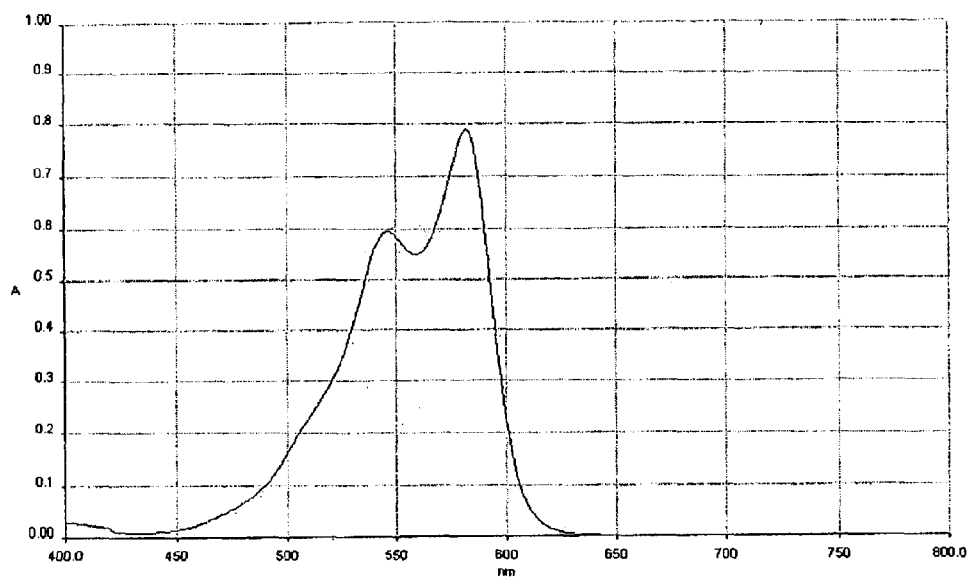
FIG. 1 is the UV-VIS spectrum of dye solution in Example 1 according to the invention.

The invention will be further explained in detail with reference to the following preferred embodiments.

Asymmetric dyes, which are trimethine-cyanine dyes substituted with different structure comprising electron-withdrawing group (EWG), could be synthesized by different methods suggested in *J. Org. Chem.* 1995, 60, 2411, U.S. Pat. No. 6,306,478 and U.S. Pat. No. 6,413,607 (Scheme 1, Scheme 2, Scheme 3). For example, in the formula (I), "A" is the formula (1), while "$D_1$" is a nitro group at the position 4 and "p" is zero; "B" is the formula (2), while "$D_2$" is hydrogen, "Y" is $C(CH_3)_2$ and "Z" is hydrogen group.

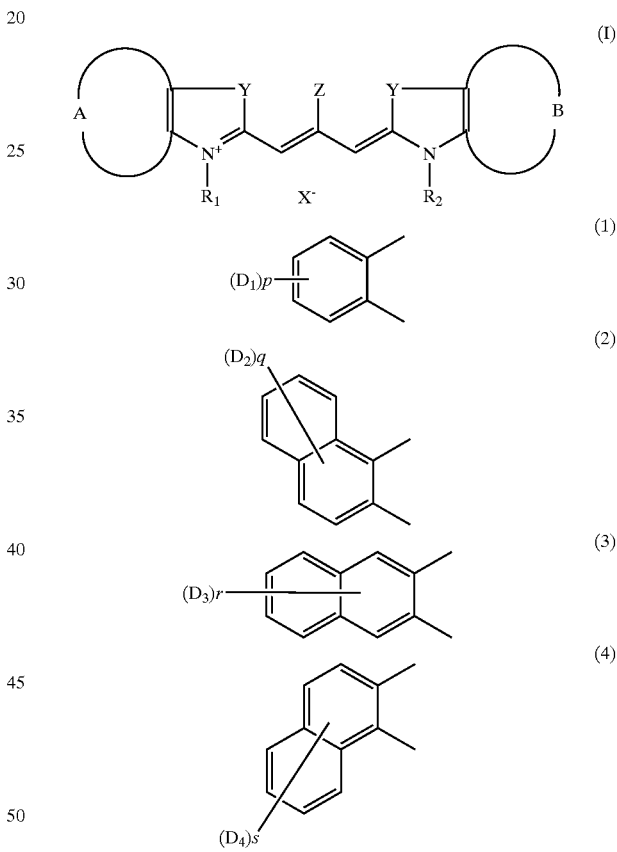

In the reaction of scheme 1, high yield of the formula (6) could not be obtained by alkylation, because the formula (5) is low reactivity, and also, violent reactive conditions and specific apparatus are needed to undergo in synthesis.

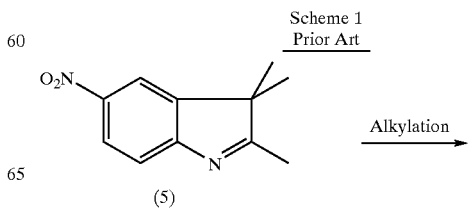

Scheme 1
Prior Art

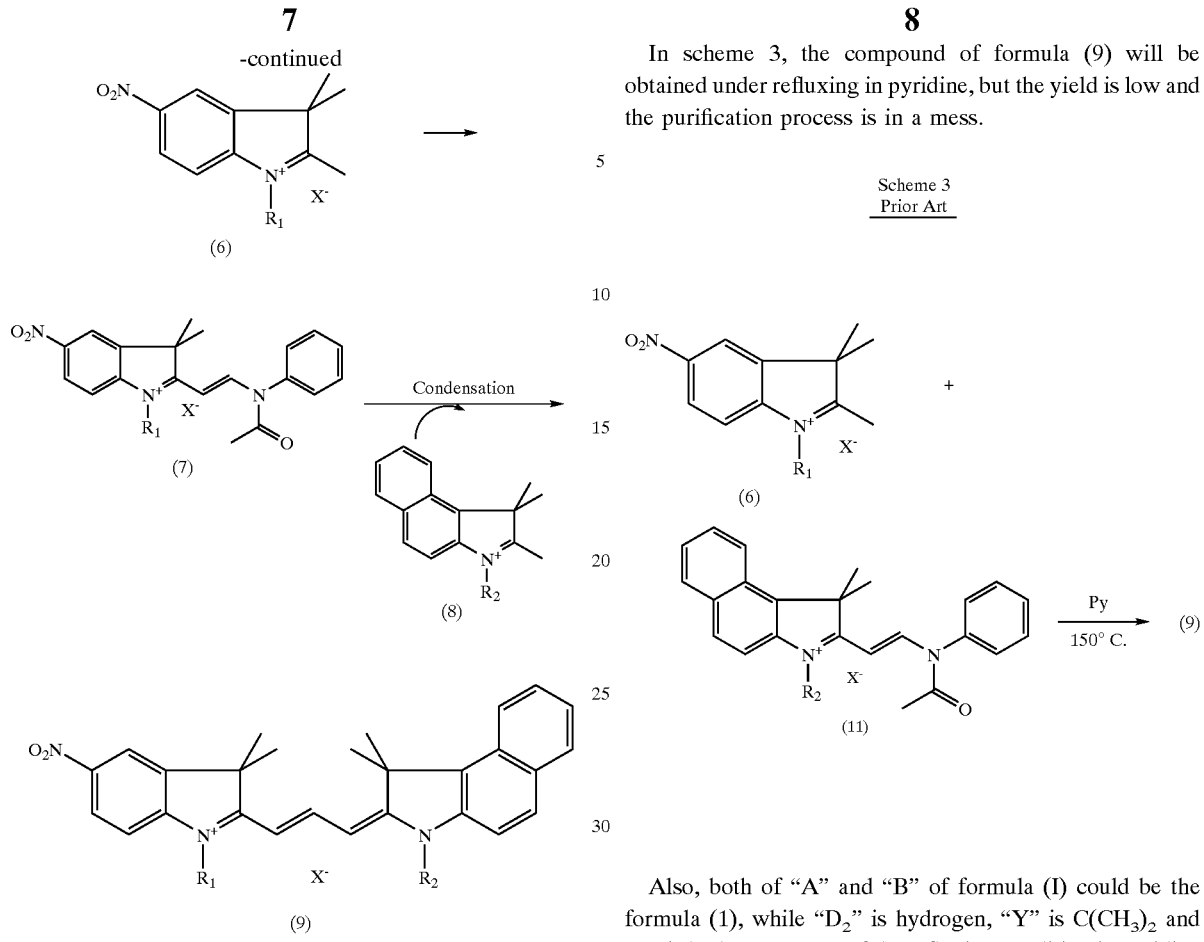

In scheme 2, even if the formula (6) is obtained, the reaction will not undergo the path 1 to obtain the target product of formula (9). In stead, the reaction will lead to the path 2, and the formula (10) will be obtained under the refluxing with acetic anhydride solvent.

In scheme 3, the compound of formula (9) will be obtained under refluxing in pyridine, but the yield is low and the purification process is in a mess.

Also, both of "A" and "B" of formula (I) could be the formula (1), while "$D_2$" is hydrogen, "Y" is $C(CH_3)_2$ and "Z" is hydrogen group. If the refluxing condition in pyridine is performed, as shown in scheme 4, the symmetric trimethine-cyanine dyes, formulas (14) and (15), will mix together with the target product of formula (13), it will take much more effort to purify and separate the mixture of three chemical compounds.

Scheme 2
Prior Art

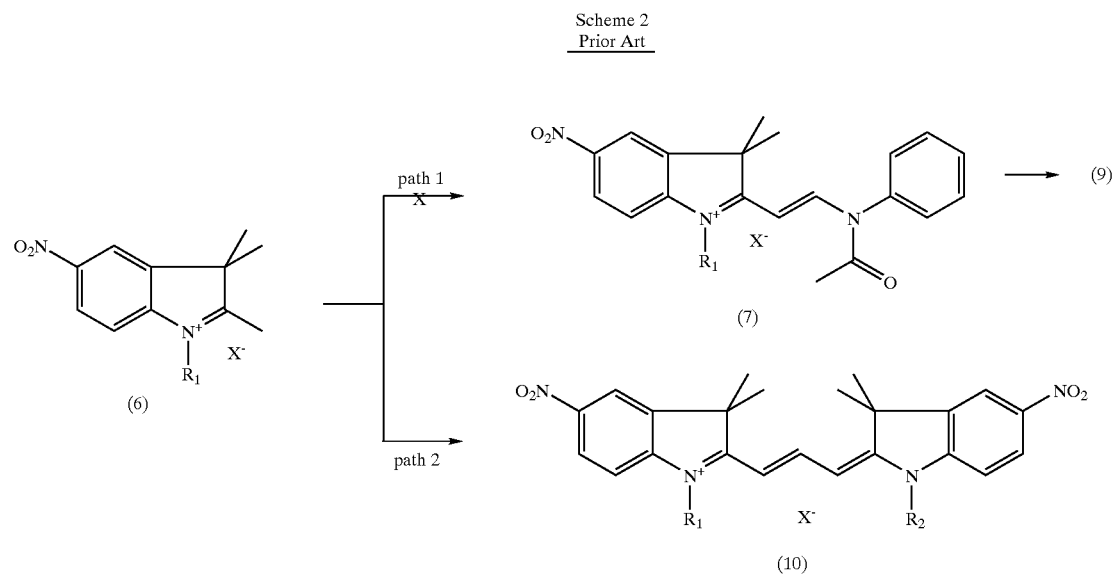

Scheme 4
Prior Art

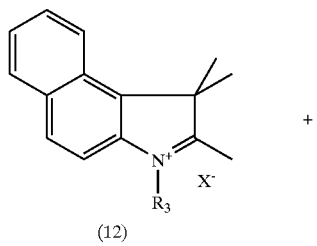

(12)

+

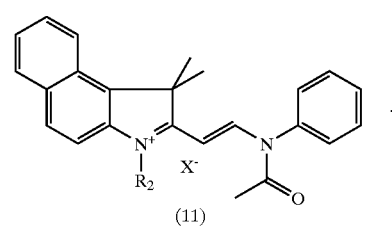

(11)

→ Py
150° C.

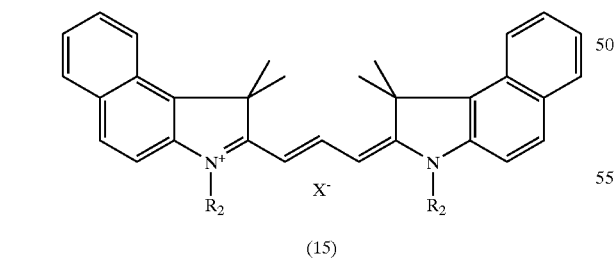

(13)

(14)

(15)

In this invention, a modified method is introduced, wherein the reactive condition is mild, the yield of asymmetric trimethine-cyanine dyes is high and the process can be used in mass production.

For example, in the formula (I), "A" is the formula (1), while "$D_1$" is a nitro group at the position 4 and "p" is zero;

"B" is the formula (1), while "$D_2$" is hydrogen, "Y" is $C(CH_3)_2$ and "Z" is hydrogen group. From the following reaction of scheme 5, formula (17) and formula (6) could be obtained easily with high yield by using well-known alkylation and nitration processes. Then, formula (6) is dissolved in alcohol solvent and mixed with N,N-diphenylformamidine under refluxing. Next, formula (18) is obtained with ideal quality and yield. Finally, formula (18)] and formula (8) are treated with basic solvent, stirred at room temperature, and formula (1) is obtained in high yield consequently. In particular, the basic solvent is a mixture of pyridine, triethylamine and acetic anhydride.

Scheme 5

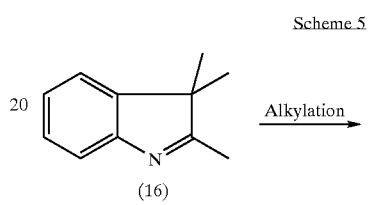

(16)

→ Alkylation

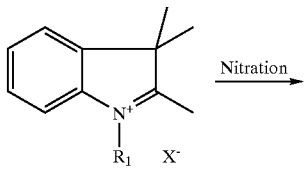

(17)

→ Nitration

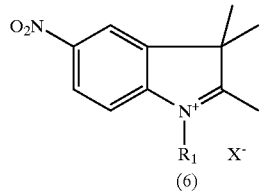

(6)

→

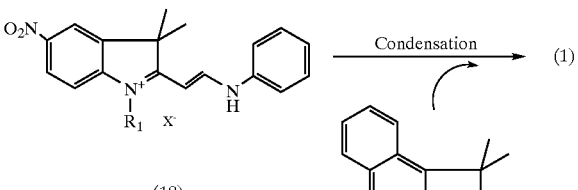

(18)

→ Condensation (1)

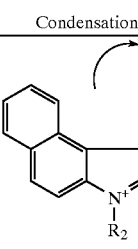

(8)

In another example, "A" and "B" of formula (I) are both represented by the formula (1), while "$D_2$" is hydrogen, "Y" is $C(CH_3)_2$ and "Z" is hydrogen group. From the following reaction of scheme 6, formula (11) and formula (12) are treated with basic solvent, stirred at room temperature, and then formula (13) is obtained in high yield. Especially, the basic solvent is a mixture of pyridine, triethylamine and acetic anhydride.

Scheme 6

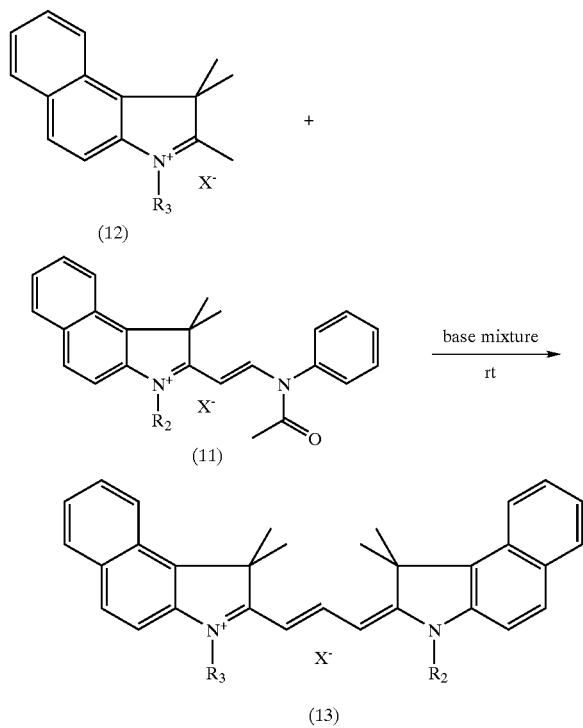

(12)

(11)

(13)

The synthetic process is also useful to another asymmetric compound. For example, formula (20) could be the formula (V), while "D" is the formula (2), "D$_2$" is hydrogen, "Y" is C(CH$_3$)$_2$ and "Z" is hydrogen group (scheme 7).

Scheme 7

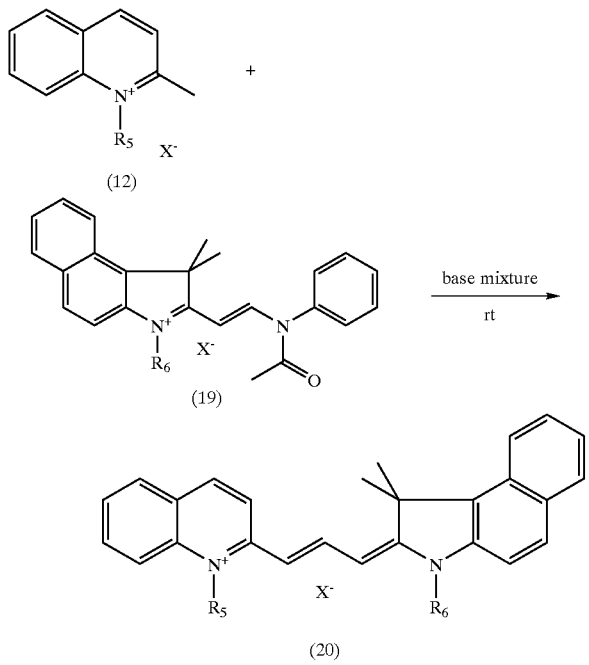

(12)

(19)

(20)

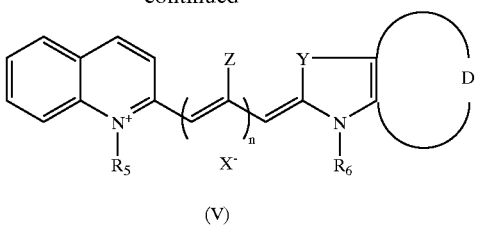

(V)

DVD Recordable Medium Formation

A cyanine dye represented by the general formula (I) was dissolved in an organic solvent, such as fluorinated alcohol, diaceton alcohol, methylethyl ketone, methanol, toluene, cyclohexanone, acetylacetone and dioxane. The concentration of the dye solution was about 0.5% to 20% by weight.

A dye mixture, which contains cyanine dye represented by general formula (1) mixed with an additive such as the formulas (II) to (IX), that is less than 50% by weight, was dissolved in an organic solvent such as fluorinated alcohol, diaceton alcohol, methylethyl ketone, methanol, toluene, cyclohexanone, acetylacetone and dioxane. The concentration of the dye solution was about 0.5% to 20% by weight.

The manufacture of the optical recording medium according to this invention can be performed as follows.

(A) The material of the substrate may be glass, epoxy resin, methacrylate resin, polycarbonate, polyester resin, polyvinyl chloride resin, or polyolefin resin. The substrate may be provided with the tracking grooves or pits.

(B) The dye solution is provided on a substrate by means of a spin-coating method.

(C) After spin coating, the substrate with dye film is baked at the temperature of 90° C. for 1 hr to 3 hr.

(D) The optical recording medium may further include a reflective layer in addition to the recording layer. The reflective layer, a single film or multiple films with high reflectivity, can be formed by vapor-deposition or sputtering metal, such as Gold, Aluminum, Silver, Cupper, Platinum and/or alloy.

(E) The reflective layer may be provided with protective layer. It is formed for the purpose of protecting or improving the optical recording medium, and can be formed by coating a solution of a radiation cure type resin on a given surface and then by radiation-curing the coater layer.

(F) The optical recording medium may be a single-side recording medium obtained by laminating a single-side substrate and a non-grooved substrate with an adhesion. The single-side optical recording medium has been prepared according to the steps (A) to (E).

(G) The optical recording medium may be a double-side recording medium obtained by laminating two single-side optical recording medium with an adhesion. The single-side optical recording medium has been prepared according to the steps (A) to (E).

The organic solvent is selected from the group consisting of fluorinated alcohol, diaceton alcohol, methylethyl ketone, methanol, toluene, cyclohexanone, acetylacetone and dioxane. Also, the concentration of the dye solution was in the range from about 0.5% to 20% by weight.

The dye solution according to the above description might further comprise some kinds of singlet oxygen quencher, such as a metal complex, a light absorbent, a radical scavenger, etc. Then, the substrate is spin-coated with the dye solution at a rotational frequency of 3000 rpm, and then is dried at 90° C. for 1 hr to form a recording layer consisting of a photosensitive dye film with a thickness of 100 nm, approximately.

The material of the substrate may be glass, epoxy resin, methacrylate resin, polycarbonate, polyester resin, polyvinyl chloride resin or polyolefin resin. Also, the substrate may be provided with the tracking grooves or pits.

Thereafter, a reflective layer is deposited on the recording layer by sputtering. The reflective layer, a metal film with high reflectivity such as Gold, Aluminum, Silver, Cupper, Platinum and alloy, can be formed by the vapor-deposition or sputtering. Also, the reflective layer could be the multi-reflective layer.

A protective layer comprising an ultraviolet-curing resin is further spin-coated on the reflective layer. The protective layer is formed for the purpose of protecting or improving the optical recording medium, and can be formed by coating a solution of a radiation cure type resin on a given surface and then by radiation-curing the coater layer.

Then a pair of the optical discs thus obtained is superimposed via an adhesive layer comprising an ultraviolet-curing resin, and thereby a laminated-disc is obtained.

It is noted that the optical recording medium could be a single-side recording medium obtained by laminating a single-side substrate and a non-grooved substrate with an adhesion, or could be a double-side recording medium obtained by laminating two single-side optical recording medium with an adhesion.

Next, a laser beam of 660 nm or further irradiates the optical discs to form the recording signals with improved characteristics, such as modulation amplitude, jitter and wide power margin.

This invention will be further explained in detail with reference to the following examples.

Dye Synthesis Process

Chemical compound of Formula (21)

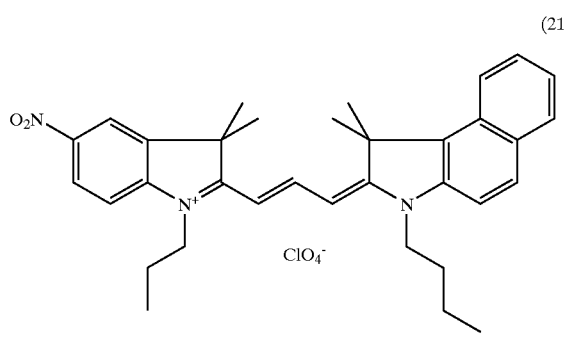

(21)

The compound of formula (22) (12 g) and 1-butyl-2,3,3-trimethylbenzo(e) indolium chlorate (9 g) are dissolved in the mixture of pyridine (20 mL), triethylamine (10 mL) and acetic anhydride (5 mL). Then the solution is stirred at room temperature for 3 hrs. After that, the solution is poured into 10% $H_2SO_4$ solution. The chemical formula (21) (15 g) is obtained after filtering and crystallizing with MeOH. The spectrum result is $\lambda_{max}$ (TFP)=577 nm; $^1$H NMR (300 MHz, CDCl$_3$) δ 0.99 (t, J=7.2 Hz, 3H), 1.06 (t, J=7.2 Hz, 3H), 1.53–1.61 (m, 4H), 1.78 (s, 6H), 1.92 (quin., J=7.2 Hz, 3H), 2.03 (s, 6H), 4.10 (t, J=7.2 Hz, 3H), 4.42 (t, J=7.2 Hz, 3H), 6.89 (d, J=13.5 Hz, 1H), 7.07 (d, J=8.8 Hz, 1H), 7.13 (d, J=13.5 Hz, 1H), 7.47 (d, J=8.8 Hz, 1H), 7.54 (t, J=7.6 Hz, 1H), 7.66 (t, J=7.6 Hz, 1H), 7.97–8.02 (m, 1H), 8.13 (d, J=8.6 Hz, 1H), 8.16 (d, J=2.1 Hz, 1H), 8.29 (dd, J=8.6, 2.1 Hz, 1H), 8.51 (t, J=13.5 Hz, 1H).

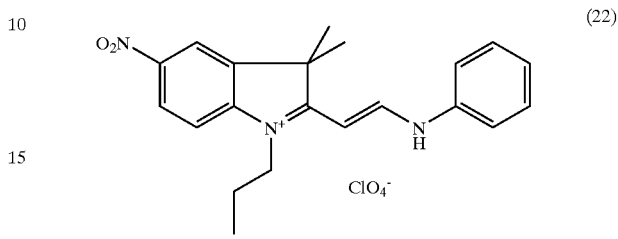

(22)

Chemical Compound of Formula (23)

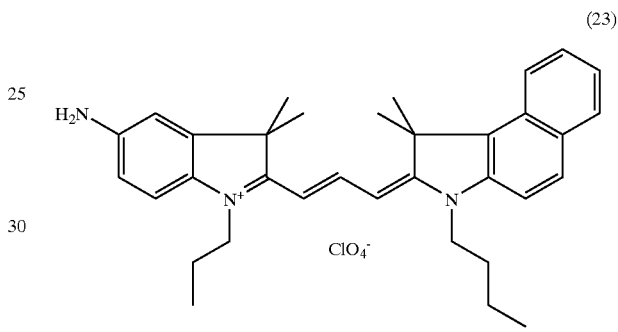

(23)

The chemical compound of formula (21) (5.7 g) and Tin chloride dihydrate (10.5 g) are dissolved in EtOH (40 mL), then the mixture is heated under refluxing for 6 hr. After cooling down to room temperature, the solution is poured into 10% NaOH solution. The formula (23) (4.5 g) is obtained after filtering and crystallizing with MeOH. The spectrum result is $\lambda_{max}$ (TFP)=576 nm; $^1$H NMR (300 MHz, CDCl$_3$) δ 0.95–1.02 (m, 6H), 1.46–1.58 (m, 4H), 1.73 (s, 6H), 1.76–1.90 (m, 4H), 2.01 (s, 6H), 4.07 (t, J=7.4 Hz, 2H), 4.15 (t, J=7.4 Hz, 2H), 6.38–6.47 (m, 2H), 6.69 (dd, J=2.2, 8.4 Hz, 1H), 6.90–6.93 (m, 2H), 7.28–7.34 (m, 1H), 7.40–7.47 (m, 1H), 7.61 (t, J=11 Hz, 1H) 7.94 (d, J=8.9 Hz, 2H), 8.10 (d, J=8.9 Hz, 1H), 8.42 (t, J=13.5 Hz, 1H).

Chemical Compound of Formula (24)

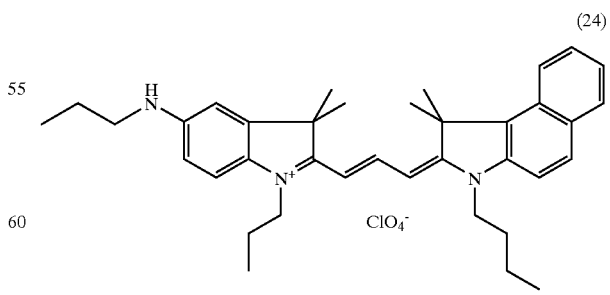

(24)

The chemical compound of formula (23) (5.7 g) and n-Propyl Iodide (3.3 g) are dissolved in Ethyl Acetate (20 mL), then the mixture is heated under refluxing for 24 hr.

After cooling down to room temperature, the solution is poured into 10% NaOH solution. The formula (24) (4.0 g) is obtained after filtering and crystallizing with MeOH. The spectrum result is $\lambda_{max}$ (TFP)=580 nm; $^1$H NMR (300 MHz, CDCl$_3$) δ 0.98–1.13 (m, 12H), 1.50–1.63 (m, 2H), 1.74 (s, 6H), 1.84–1.96 (m, 4H), 2.0 (s, 6H), 3.03–3.16 (m, 2H), 3.88–4.21 (m, 4H), 6.57–6.76 (m, 4H), 6.98 (d, J=8.5 Hz, 1H), 7.33 (d, J=8.8 Hz, 1H), 7.44 (t, J=7.5 Hz, 1H), 7.59 (t, J=7.5 Hz, 1H), 7.92 (dd, J=4.0, 8.0 Hz, 2H), 8.10 (d, J=8.5 Hz, 1H), 8.41 (t, J=13.5 Hz, 1H).

Chemical Compound of Formula (25)

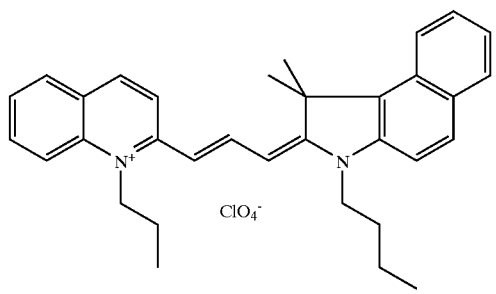

(25)

Chemical Compound of Formula (26) (1.0 g) and the chemical formula (27) (1.79 g) are dissolved in the mixture of pyridine (4 mL), triethylamine (2 mL) and acetic anhydride (1 mL). Then the solution is stirred at room temperature for 3 hrs. After that, the solution is poured into 10% H$_2$SO$_4$ solution. The chemical compound of formula (25) (1.8 g) is obtained after filtering and crystallizing with MeOH. The spectrum result is $\lambda_{max}$ (TFP)=580 nm; $^1$H NMR (300 MHz, DMSO-d$_6$) δ1.02 (t, J=7.4 Hz, 3H), 1.14 (t, J=7.4 Hz, 3H), 1.45 (m, 2H), 1.75 (m, 2H), 1.85 (m, 2H), 1.97 (s, 6H), 4.15 (t, J=7.4 Hz, 2H), 4.56 (t, J=7.4 Hz, 2H), 6.43 (d, J=12.9 Hz, 1H), 6.72 ((d, J=12.9 Hz, 1H), 7.45 (t, J=7.2 Hz, 1H), 7.47–7.67 (m, 3H), 7.87–8.16 (m, 8H), 8.30 (t, J=12.9 Hz, 1H).

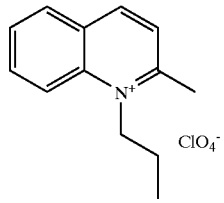

(26)

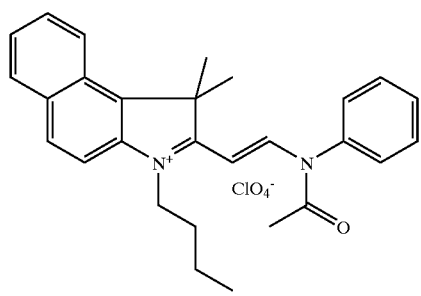

(27)

Disc Test 1

There are eight experiments, Examples 1, 2, 3, 4 and Comparative Examples 1, 2, 3, 4 conducted in Disc Test 1, and the results are summarized in Table 1. The experimental details are described as follows.

TABLE 1

| Example | UV Spectrum (nm) (TFP) | Write (660 nm) | Write power (mW) | Jitter % |
|---|---|---|---|---|
| 1 | 577 | OK | 10.1 | 6.7 |
| 2 | 577 | OK | 9.8 | 7.5 |
| 3 | 581 | OK | 8.3 | 7.5 |
| 4 | 581 | OK | 8.4 | 7.9 |
| Comparative 1 | 566 | Not available | | |
| Comparative 2 | 568 | Not available | | |
| Comparative 3 | 568 | Not available | | |
| Comparative 4 | 550 | Not available | | |

EXAMPLE 1

First, a transparent substrate, which is a disc made of a polycarbonate resin and has a spiral pre-groove with track pitch 0.74 μm thereon, is provided. The outer diameter of the substrate is about 120 mm and the thickness is about 0.6 mm.

Then, the compounds of formula (28) (3.0 g) and formula (29) (0.7 g) descended from the formula (I) are dissolved in TFP (2,2,3,3-tetrafluoro-1-propanol) (50 mL) by stirring for 5 hrs at room temperature. The UV-VIS spectrum of dye solution, which is measured by Ultraviolet-visible spectrometer (made by Perkin Elmer), is presented in FIG. 1. The resulting solution is filtered through PTFE (0.2 μm) membrane filter to prepare a dye solution.

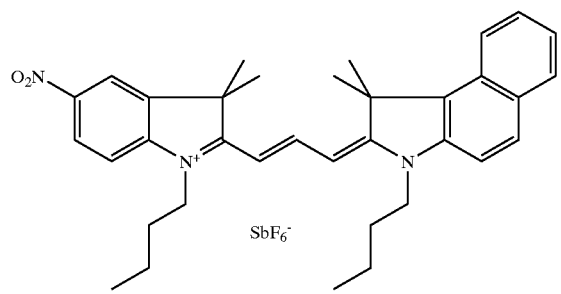

(28)

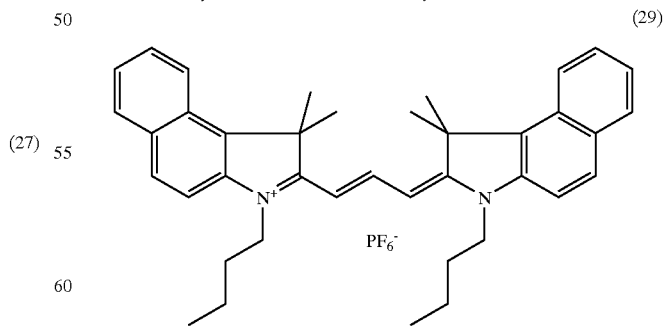

(29)

This substrate is spin-coated with the dye solution at a rotational frequency of 3000 rpm, and then dried at 90° C. for 1 hr to form a recording layer comprising a photosensitive dye film with a film thickness of 100 nm.

Next, Ag is sputtered on this recording layer to form a reflective layer with a thickness of 100 nm. An argon gas is used as, sputtering gas. The sputtering power is 1.5 kW and the sputtering pressure is $1.0 \times 10^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet rays. Consequently, an adhesive region of 25 μm in thickness and 32 mm to 120 mm in diameter are formed, and a laminated-disc type of optical disc is obtained.

Finally, a recording step is performed on this optical disc by a recording machine of DVD-R/RW A03, PIONEER. The machines of DVDT-2R, DVD-R/RW TESTER, DVDT-2R660 for general, EXPERT MAGNETICS Co., Ltd. are used to measure the reflectance, push-pull, jitter and modulation amplitude. The results of measurements are shown in Table 1.

In example 1, the results listed in Table 1 indicate that the writing power (Po) and jitter are performed well by using the DVD-R machine with the writing wavelength of 660 nm.

EXAMPLE 2

Figure 2:
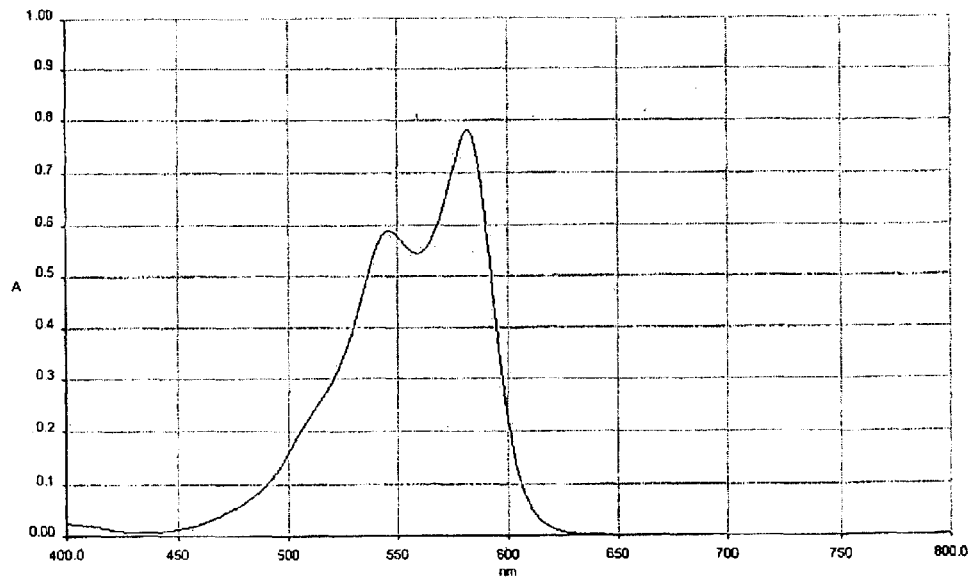
FIG. 2 is the UV-VIS spectrum of dye solution in Example 2 according to the invention.

An optical recording disc is manufactured in the same manner as described in example 1, except the dye material is replaced by the mixture of formula (28) (0.3 g), formula (29) (0.7 g) descended from the general formula (I), and formula (30) (0.05 g) descended from the general formula (II). The UV-VIS spectrum of dye solution, which is measured by Ultraviolet-visible spectrometer (made by Perkin Elmer), is presented in FIG. 2. The optical parameters of the recording layer are measured in the same manner as illustrated in example 1, and the results of measurements are shown in Table 1.

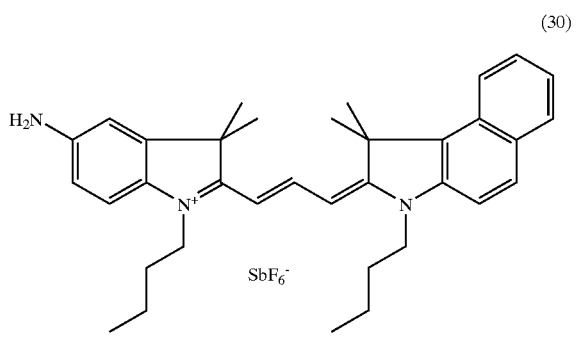

(30)

In example 2, the results listed in Table 1 indicate that the writing power (Po) and jitter are performed well by using the DVD-R machine with the writing wavelength of 660 nm.

EXAMPLE 3

Figure 3:
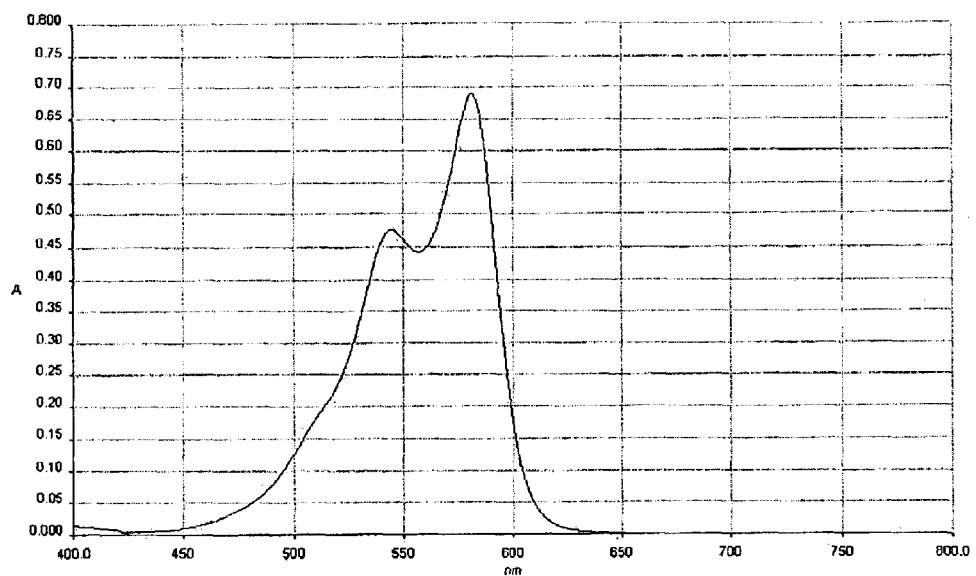
FIG. 3 is the UV-VIS spectrum of dye solution in Example 3 according to the invention.

An optical recording disc is manufactured in the same manner as described in example 1, except the dye material is replaced by the formula (31) (0.9 g) descended from the general formula (I), and formula (32) (0.05 g) descended from the general formula (V). The UV-VIS spectrum of dye solution, which is measured by Ultraviolet-visible spectrometer (made by Perkin Elmer), is presented in FIG. 3. The optical parameters of the recording layer are measured in the same manner as illustrated in example 1, and the results of measurements are shown in Table 1.

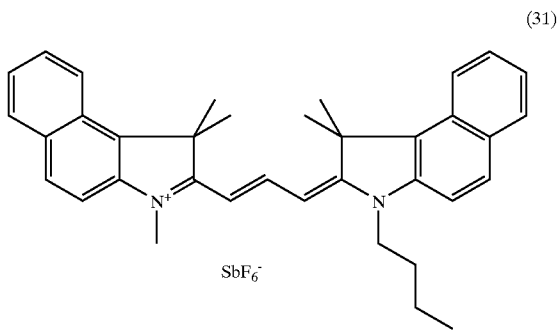

(31)

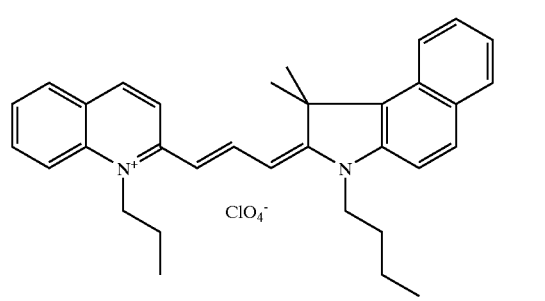

(32)

In example 3, it indicates that the writing power (Po) and jitter (Table 1) are performed well by using the DVD-R machine with the writing wavelength of 660 nm.

EXAMPLE 4

Figure 4:
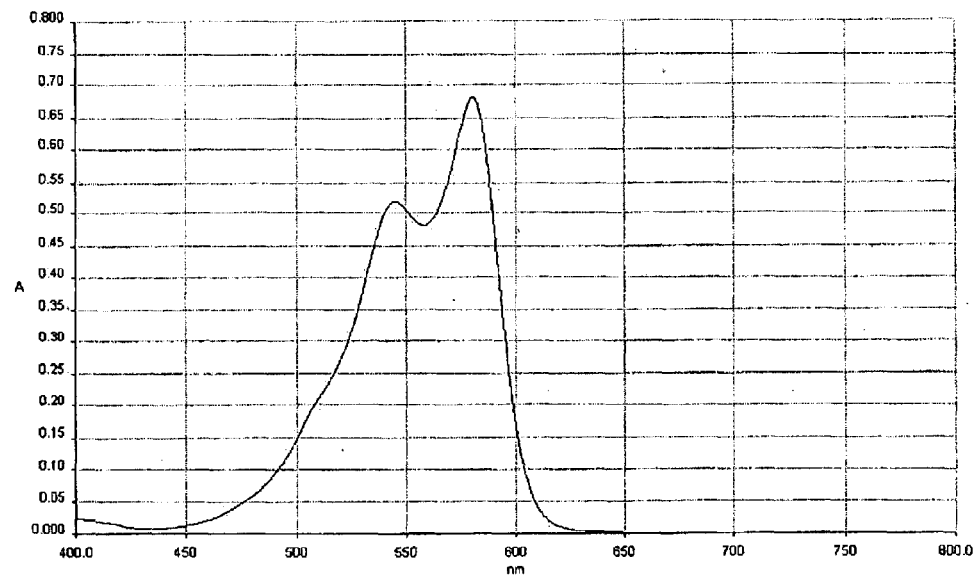
FIG. 4 is the UV-VIS spectrum of dye solution in Example 4 according to the invention.

An optical recording disc is manufactured in the same manner as described in example 1, except the dye material is replaced by the formula (31) (1.0 g) descended from the general formula (I), and formula (33) (0.05 g). The UV-VIS spectrum of dye solution, which is measured by Ultraviolet-visible spectrometer (made by Perkin Elmer), is presented in FIG. 4. The optical parameters of the recording layer are measured in the same manner as illustrated in example 1, and the results of measurements are shown in Table 1.

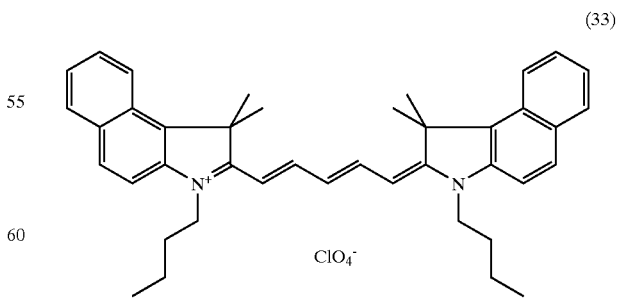

(33)

In example 4, it indicates that the writing power (Po) and jitter (Table 1) are performed well by using the DVD-R machine with the writing wavelength of 660 nm.

COMPARATIVE EXAMPLE 1

Figure 5:
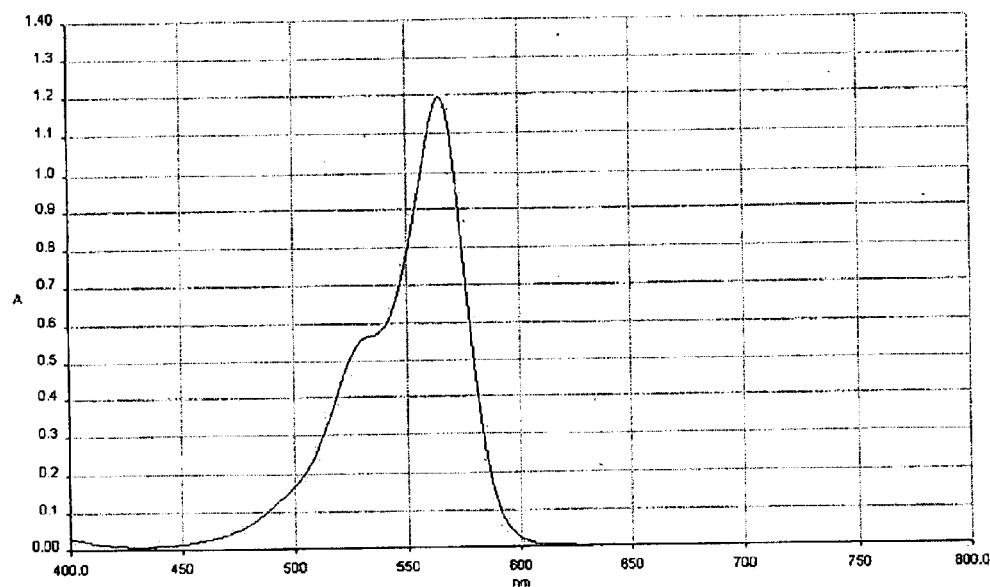
FIG. 5 is the UV-VIS spectrum of dye solution in Comparative Example 1 according to the invention.

An optical recording disc is manufactured in the same manner as described in example 1, except that dye material is replaced with the mixture of formula (34) (2.0 g) and formula (29) (0.2 g). The UV-VIS spectrum of dye solution, which is measured by Ultraviolet-visible spectrometer (made by Perkin Elmer), is presented in FIG. 5. The optical parameters of the recording layer are measured in the same manner as illustrated in example 1, and the results of measurements are shown in Table 1.

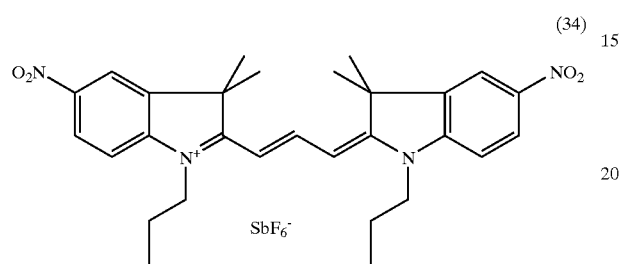

(34)

In this comparative example 1, the results indicate that the recording cannot be performed by using the DVD-R machine with the writing wavelength of 660 nm, but it is performed well while the writing wavelength is 635 nm.

COMPARATIVE EXAMPLE 2

Figure 6:
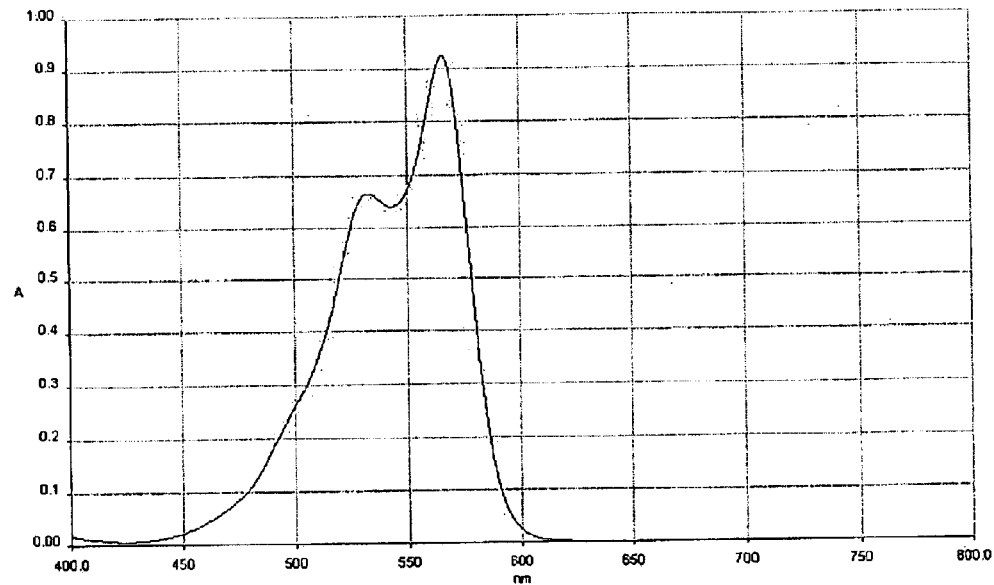
FIG. 6 is the UV-VIS spectrum of dye solution in Comparative Example 2 according to the invention.

An optical recording disc is manufactured in the same manner as described in example 1, except that dye material is replaced with the mixture of formula (35) (2.0 g) and formula (29) (0.3 g). The UV-VIS spectrum of dye solution, which is measured by Ultraviolet-visible spectrometer (made by Perkin Elmer), is presented in FIG. 6. The optical parameters of the recording layer are measured in the same manner as illustrated in example 1, and the results of measurements are shown in Table 1.

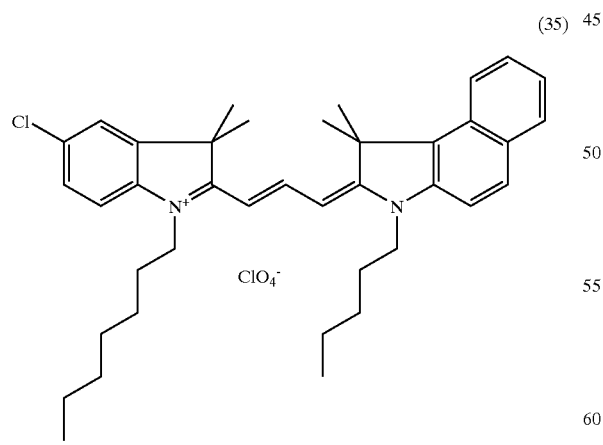

(35)

In this comparative example 2, the results indicate that the recording cannot be performed by using the DVD-R machine with the writing wavelength of 660 nm, but it is performed well while the writing wavelength is 635 nm.

COMPARATIVE EXAMPLE 3

Figure 7:
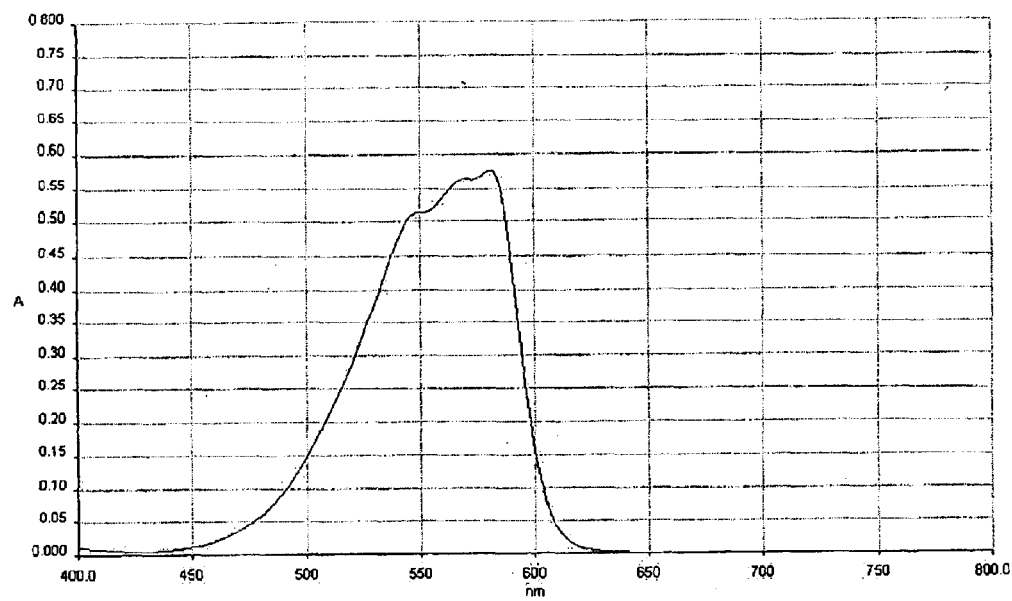
FIG. 7 is the UV-VIS spectrum of dye solution in Comparative Example 3 according to the invention.

An optical recording disc is manufactured in the same manner as described in example 1, except that dye material is replaced with the mixture of formula (36) (2.0 g) and formula (29) (0.3 g). The UV-VIS spectrum of dye solution, which is measured by Ultraviolet-visible spectrometer (made by Perkin Elmer), is presented in FIG. 7. The optical parameters of the recording layer are measured in the same manner as illustrated in example 1, and the results of measurements are shown in Table 1.

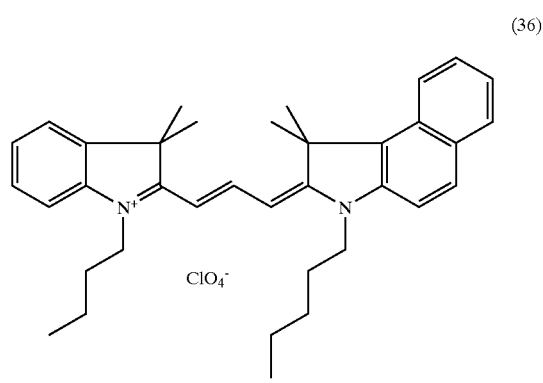

(36)

In this comparative example 3, the results indicate that the recording cannot be performed by using the DVD-R machine with the writing wavelength of 660 nm, but it is performed well while the writing wavelength is 635 nm.

COMPARATIVE EXAMPLE 4

Figure 8:
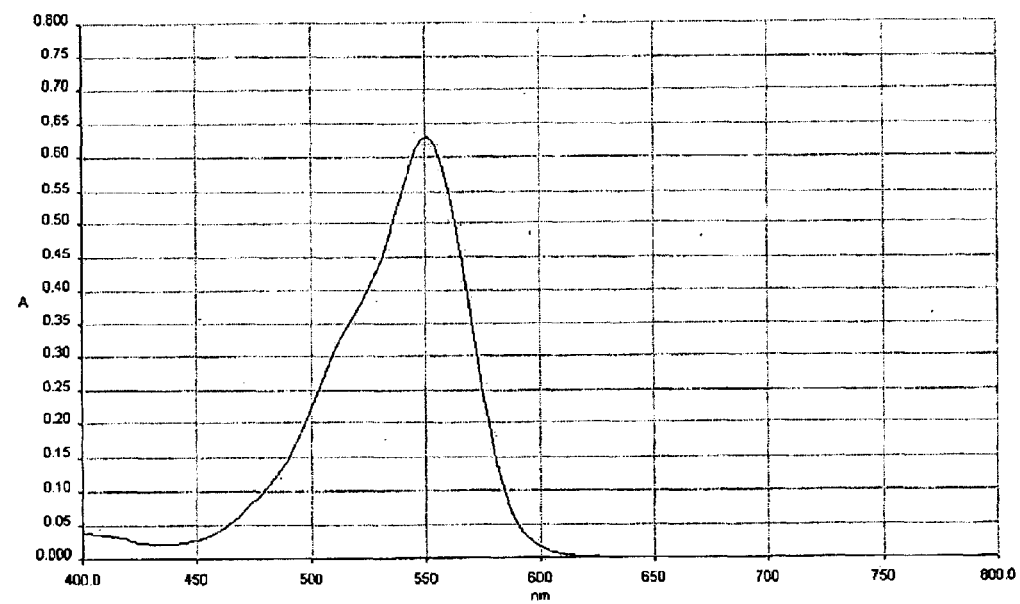
FIG. 8 is the UV-VIS spectrum of dye solution in Comparative Example 4 according to the invention.

An optical recording disc is manufactured in the same manner as described in example 1, except that dye material is replaced with the mixture of formula (37) (2.0 g) and formula (29) (0.3 g). The UV-VIS spectrum of dye solution, which is measured by Ultraviolet-visible spectrometer (made by Perkin Elmer), is presented in FIG. 8. The optical parameters of the recording layer are measured in the same manner as illustrated in example 1, and the results of measurements are shown in Table 1.

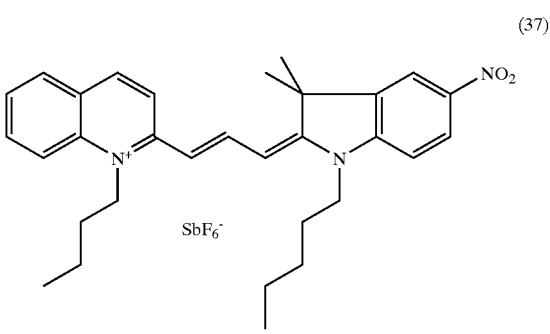

(37)

In this comparative example 4, the results indicate that the recording cannot be performed by using the DVD-R machine with the writing wavelength of 660 nm, but it is performed well while the writing wavelength is 635 nm.

From the above description, the results of Example 1 to Example 4 are satisfied, while the wavelength of laser beam 660 nm is used in the recorder. In Example 1 to Example 4, the recording layer comprising at least one kind of trimethine-cyanine dyes, and an additive such as chemical compounds of formula (28), formula (30), formula (32) and formula (33). In all of these examples, the lambda maximum of UV-VIS spectrum in dye solution are larger than 575 nm; however, in comparative example 1 to comparative example 4, the lambda maximum of UV-VIS spectrum in dye solution are in the range of 550 nm to 570 nm. According to the writing test by Expert DVDT-2R, the write power of all comparative examples are larger than 12 mW, that is out of DVD specifications for recordable disk for 1×speed record. Due to the high writing power, the optical disc failed in record while use DVD-R/RW A03, PIONEER as the recorder.

Figure 9:
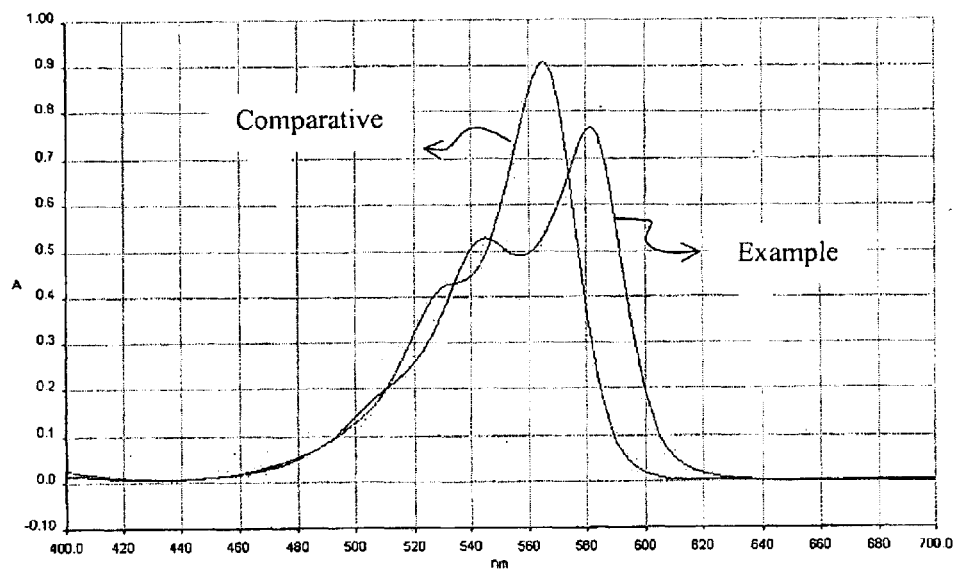
FIG. 9 is the general comparison of UV-VIS spectrum of dye solutions between Example and Comparative Example.

As shown in FIG. 9, in solution type, it shows the same result that the dye components in examples are more sensitive than that in comparative examples.

Figure 10:
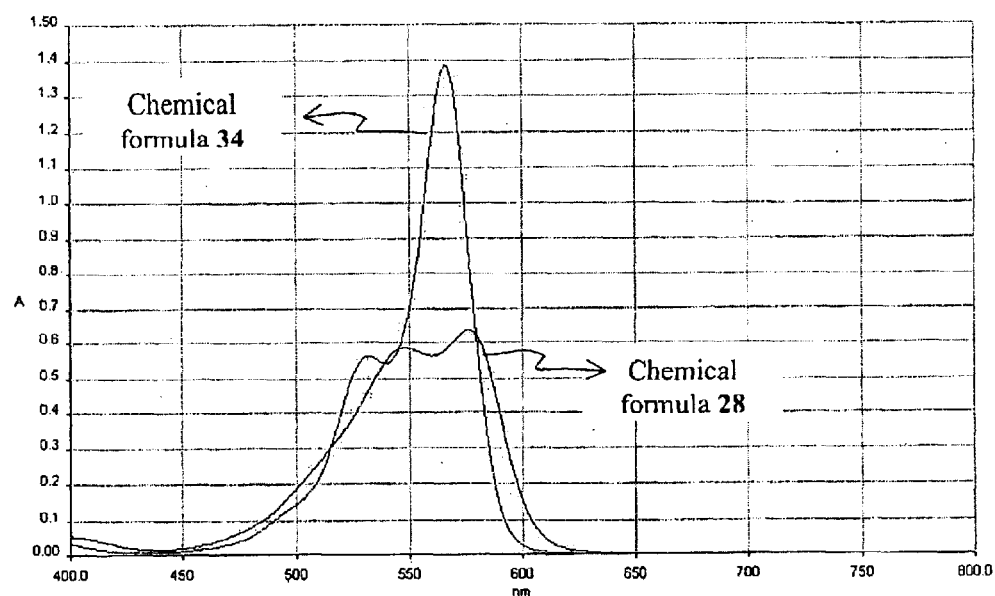
FIG. 10 is the comparison of UV-VIS spectrum of dye solutions between Example 1 and Comparative Example 1.

Also, compare the additives between example 1 (formula 28) and comparative example 1 (formula 34), the chemical compound of formula 28 is an asymmetric cyanine dye with nitro subsistent to one of indolium ring, while the chemical compound of formula 34 has a symmetric structure with nitro subsistent. The UV-VIS spectrum is presented in FIG. 10 and the results are listed in Table 1. It indicates that the asymmetric cyanine dye with nitro subsistent to one of indolium ring has a better performance than the symmetric one.

Figure 11:
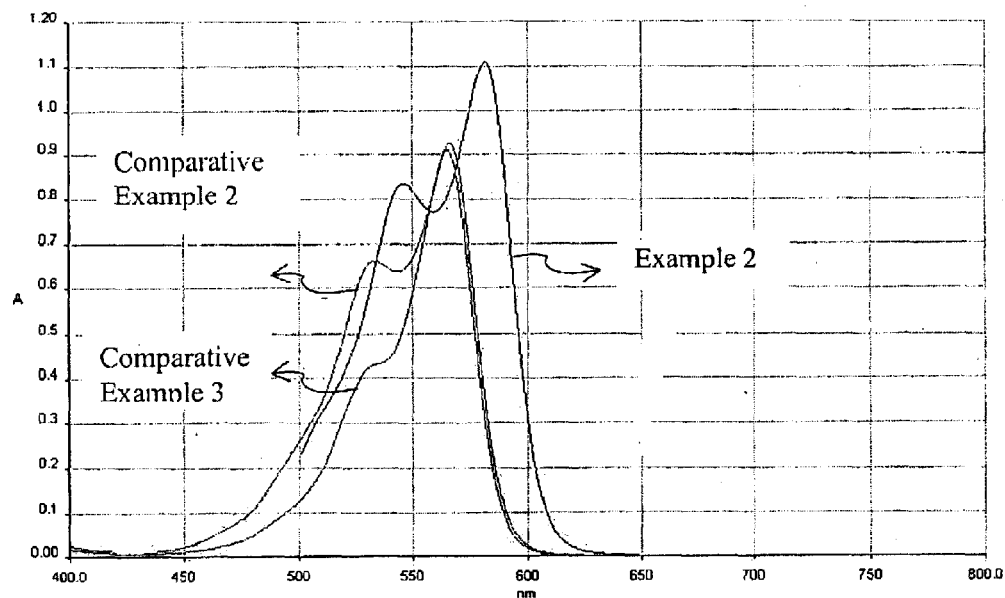
FIG. 11 is the comparison of UV-VIS spectrum of dye solutions between Example 2, Comparative Examples 2 and 3.

The additives between example 2 (formula 30), comparative example 2 (formula 35) and comparative example 3 (formula 36) are also compared, wherein the subsistent is changed from amino group (example 2) to chlorine (comparative example 2) or hydrogen (comparative example 3). The results show that the recording sensitivity of comparative examples 2 and 3 are reduced and then failed in recording (Table 1) due to the UV-VIS curves (FIG. 11) are shifted to shorter wavelength.

Figure 12:
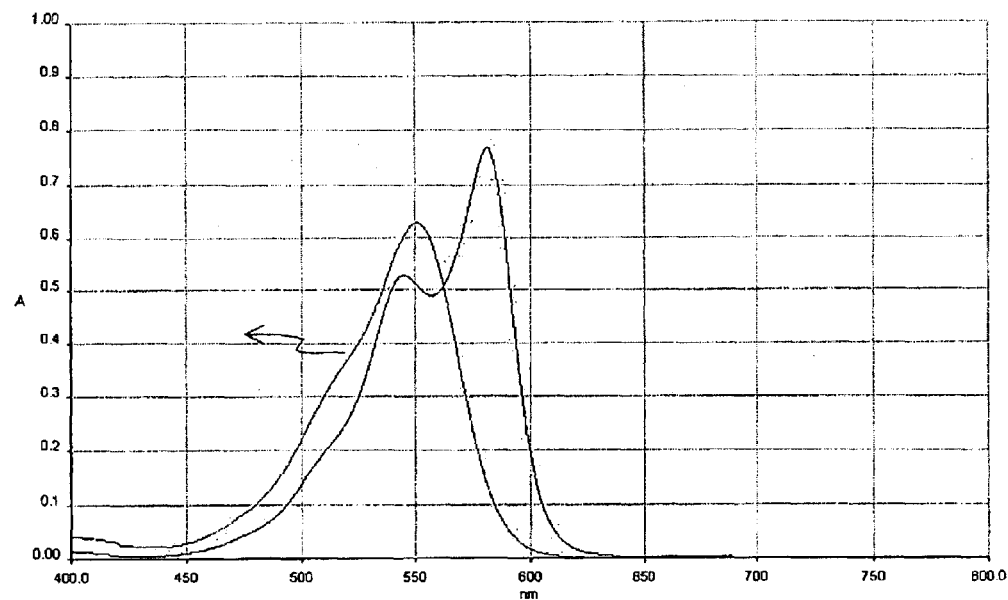

Moreover, Compare the additives between example 3 (formula 31) and comparative example 4 (formula 37), it also indicates that the recording sensitivity of comparative example 4 is reduced and then failed in recording due to the UV-VIS curve (FIG. 12) is shifted to shorter wavelength, as the results listed in Table 1.

Disc Test 2

There are two experiments, Examples 5, 6 conducted in Disc Test 2, and the results are summarized in Table 2. The experimental details are described as follows.

TABLE 2

| Example | Write power (mW) | R14H (%) | I14/I14H | Jitter % |
|---|---|---|---|---|
| 5 | 14.3 | 56.5 | 0.67 | 8.5 |
| 6 | 12.7 | 52 | 0.69 | 8.3 |

EXAMPLE 5

First, a transparent substrate, which is a disc made of a polycarbonate resin and has a spiral pre-groove with track pitch 0.74 μm thereon, is provided. The outer diameter of the substrate is about 120 mm and the thickness is about 0.6 mm.

The Compounds of formula (28) (3.0 g) and formula (29) (0.7 g) descended from the formula (I) are dissolved in TFP (2,2,3,3-tetrafluoro-1-propanol) (50 mL) by stirring for 5 hrs at room temperature. The resulting solution is filtered through PTFE (0.2 μm) membrane filter to prepare a dye solution.

This substrate is spin-coated with the dye solution at a rotational frequency of 3000 rpm, and then dried at 90° C. for 1 hr to form a recording layer comprising a photosensitive dye film with a film thickness of 100 nm.

Next, Ag is sputtered on this recording layer to form a reflective layer with a thickness of 100 nm. Argon gas is used as the sputtering gas. The sputtering power is 1.5 kW and the sputtering pressure is $1.0 \times 10^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet rays. Consequently, an adhesive region of 25 μm in thickness and 32 mm to 120 mm in diameter are formed, and a laminated-disc type of optical disc is obtained.

Finally, a recording step is performed on this optical disc by a recording machine of DVD+RW/+R, MP5125A, RICOH. The machines of DVD+R/RW TESTER, EXPERT MAGNETICS Co., Ltd. are used to measure the reflectance, push-pull, jitter and modulation amplitude. The results of measurements are shown in Table 2.

EXAMPLE 6

An optical recording disc is manufactured in the same manner as described in example 5, except the dye material is replaced by the formula (31) (0.9 g) descended from the general formula (I), and formula (32) (0.05 g) descended from the general formula (V). The optical parameters of the recording layer are measured in the same manner as illustrated in example 5, and the results of measurements are shown in Table 2.

According to DVD+R 4.7 Gbytes Basic Format Specifications, ver. 0.9, the recording wavelength of laser beam for DVD+R is in the range of 650 nm to 665 nm, and the recording speed is larger than 2×. Therefore, the sensitivity of recording layer should be increased.

From the results listed in Table 2, example 5 and example 6 are all performed well in Modulation (I14/I14H) and jitter.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical recording medium provided on a substrate with a recording layer, said recording layer comprising at least one kind of the trimethine-cyanine dye and an additive, wherein said the additive of recording layer selectively has a larger absorbability at the wavelength of laser beam.

2. The optical recording medium of claim 1, the additive comprises the dye selected from the group consisting of the chemical compounds represented by the following general formula (II) to (IX):

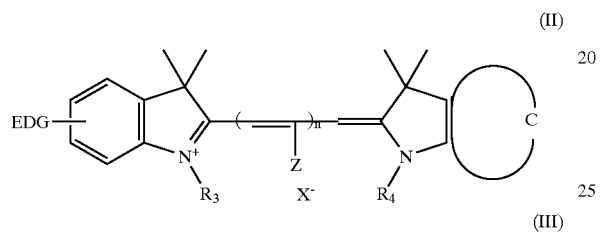
(II)

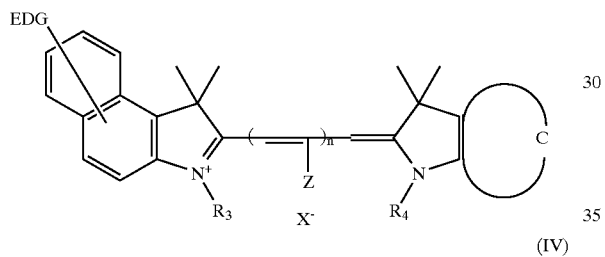
(III)

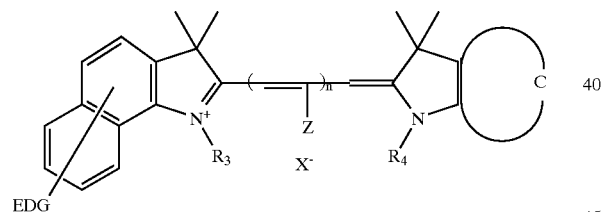
(IV)

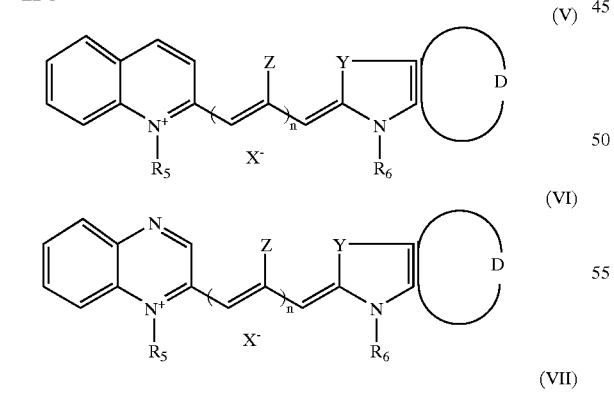
(V)
(VI)

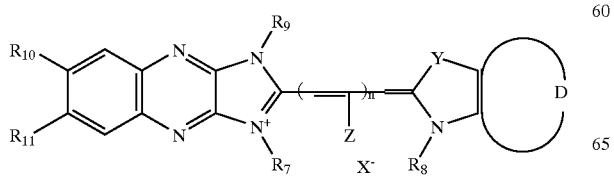
(VII)

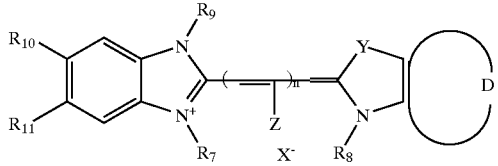
(VIII)

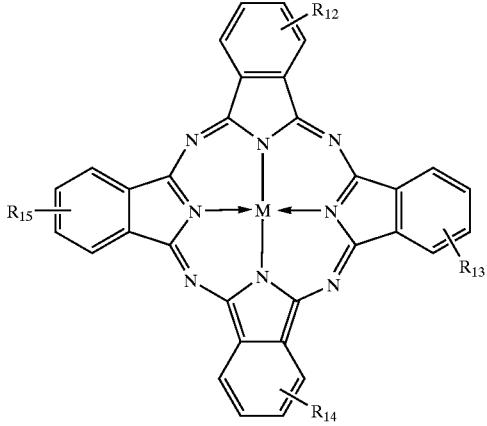
(IX)

wherein "C" and "D" are independently selected from one of the following general formulas (1), (2), (3), and (4);

$(D_1)p, (D_2)q, (D_3)r, (D_4)s$ are independently selected from the substituted or unsubstitued alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl group which are bonded to a metallic ion or alkyl, phenyl, benzyl, alkylphenyl or phenoxyalkyl group;

"Z" is hydrogen atom, halogen atom or alkyl group;

"X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, and akylcarboxylate;

"Y" is an atom, substituted or unsubstitued alkyl group;

"$R_3$" to "$R_{15}$" are the same or different from each other and individually selected from substituted or unsubstitued alkyl, phenyl, benzyl, alkylphenyl or phenoxyalkyl group;

"EDG" represents any electron-donating substituted group; and

"M" is a hydrogen atom☐ metal atom or metal oxide.

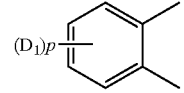
(1)

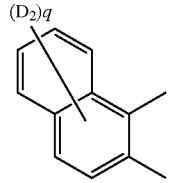
(2)

-continued

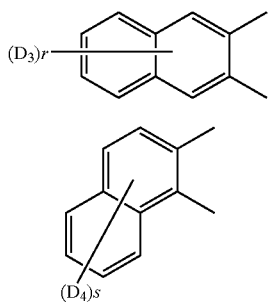

(3)

(4)

3. The optical recording medium of claim 2, wherein "EDG" is an amino group.

4. The optical recording medium of claim 2, wherein "EDG" is an alkylamino group.

5. The optical recording medium of claim 2, wherein "EDG" is a methoxy group.

6. The optical recording medium of claim 2, wherein "Y" is a group of $C(CH_3)_2$.

7. The optical recording medium of claim 2, wherein "Y" is an atom of sulfur (S).

8. The optical recording medium of claim 2, wherein "Y" is an atom of nitrogen (N).

9. The optical recording medium of claim 2, wherein "Y" is an atom of selenium (Se).

10. The optical recording medium of claim 2, wherein "Y" is an atom of oxygen (O).

11. The optical recording medium of claim 2, wherein "M" is a metal atom of copper (Cu).

12. The optical recording medium of claim 2, wherein "M" is a metal atom of palladium (Pd).

13. The optical recording medium of claim 2, wherein "M" is a metal atom of nickel (Ni).

14. The optical recording medium of claim 2, wherein "M" is a metal atom of iron (Fe).

15. The optical recording medium of claim 2, wherein "M" is a metal atom of copper cobalt (Co).

* * * * *